United States Patent Office

2,854,380
Patented Sept. 30, 1958

2,854,380

AQUEOUS THERAPEUTIC COMPOSITION COMPRISING RESERPINE, PROPYLENE GLYCOL AND SORBITOL

Erik H. Jensen and Harry Sponnoble, Kalamazoo Township, Kalamazoo County, Mich., assignors to The Upjohn Company, Kalamazoo, Mich., a corporation of Michigan No Drawing. Application September 6, 1955
Serial No. 532,781

7 Claims. (Cl. 167—67)

This invention relates to a therapeutic composition and process for its production, and more particularly relates to a fluid dosage form of reserpine and a process for its production.

Reserpine is now a well recognized therapeutic agent useful in the treatment of neuropsychiatric disorders and hypertension. Reserpine is essentially a tranquilizing agent, which is most useful in the treatment of the agitated, overactive and combative psychotic patient. It provides an emotional insulation which is similar in quality to that produced by leucotomy. It is often equally as effective as electro-shock therapy and/or insulin shock therapy but is infinitely less hazardous and troublesome.

For obvious reasons it is therapeutically desirable to have fluid oral and parenteral dosage forms of such a useful therapeutic agent. In the development of such a dosage form it was unexpectedly discovered that a specific vehicle not only has a stabilizing effect on the reserpine chemically but also enhances the physiological activity of reserpine.

It is therefore an object of the present invention to provide a fluid dosage form of reserpine. Another object is the provision of such a dosage form which has a stabilizing effect upon the reserpine chemically. A further object is the provision of such a dosage form which enhances the physiological activity of reserpine. A still further object is the provision of such a dosage form in which the vehicle is readily miscible with other active ingredients which may be added to reserpine for therapeutic purposes. A still further object is the provision of such a dosage form which is stable in the presence of light. Other objects will be apparent to one skilled in the art to which this invention pertains.

The foregoing and additional objects have been accomplished by the provision of a therapeutic composition comprising reserpine as the essential active ingredient and an aqueous solvent system containing propylene glycol and sorbitol. The composition is a stable, fluid, pharmaceutical preparation of dissolved reserpine possessing a rapid physiological activity. In its broad aspect the aqueous solvent system for the reserpine comprises propylene glycol, sorbitol and water. The combination of propylene glycol, sorbitol and ethanol in water is most especially preferred. The use of sorbitol in the vehicle increases chemical stability and therapeutic effect. The sorbitol also improves the taste of the preparation in an oral dosage form and eliminates the need for preservatives since it sweetens the preparation without providing a fermentation medium for contaminating organisms. Both propylene glycol and ethanol act as solvents for reserpine which is practically insoluble in aqueous media and not only contribute to the chemical stability of the reserpine but also bring about a more rapid onset of physiological effect. The development of narcosis, which usually results when ethanol and reserpine are used alone, is avoided by using ethanol in combination with propylene glycol and sorbitol. The combination of ethanol, propylene glycol and sorbitol is therefore preferred.

The addition of an acid in the composition of the present invention is highly desirable for several reasons. First, it is desirable to adjust the pH between about 3 and 5, preferably about 4. Reserpine is chemically unstable at a strongly basic pH due to hydrolysis. A pH of 9 or less is relatively satisfactory from this standpoint. A pH of less than 3 is painful upon parenteral injection. Thus, all things taken into consideration a pH of about 4 is preferred. Second, acid is necessary at higher concentrations of reserpine (i. e., 0.5 milligram per milliliter or more) to provide a clear solution. Third, even at lower concentrations of reserpine, the reserpine will not stay in solution when the vehicle is diluted with other liquids for prescription use unless acid is present. Fourth, the acid improves the miscibility of the vehicle when diluted.

The acid used in the composition of the present invention must have the following characteristics:

(1) Forms a salt of reserpine which is soluble in the vehicle;
(2) Is itself stable in the vehicle;
(3) Is non-toxic itself and does not decompose to a toxic product;
(4) Does not inactivate the reserpine;
(5) Does not promote crystal formation during storage.

Among the acids possessing the foregoing characteristics are the following: benzoic, maleic, tartaric, acetic, propionic, glutaric, succinic, hydrochloric, nitric, sulfuric, lactic, pyruvic, gluconic, citric and ascorbic. Because of their superior all-around ability to fulfill the foregoing requirements, citric and ascorbic acids are preferred, although, as the subsequent data will indicate, ascorbic acid is especially outstanding in stabilizing the reserpine chemically and, for that reason, is most especially preferred.

The solvent system of the present invention is designed not only to dissolve and stabilize reserpine but also as a solvent for most additives which may be used with the product. Most active ingredients which can be advantageously used with reserpine are both compatible and miscible with the solvent system of the present invention.

In the description and claims to follow all percentages are on a weight/volume basis unless otherwise specified.

The concentrations of the various ingredients in the novel composition of the present invention are important but can be varied depending upon therapeutic effect and the dosage form desired. For example, the concentration would be greater in a drop dosage form for pediatric use than it would be in the more fluid oral form taken in teaspoon amounts. The same would hold true for a parenteral form as compared with the usual fluid oral form. Taking all factors into consideration, a concentration between about 0.001 and 0.5 percent reserpine can be used. The concentrations of the other ingredients will vary with the dosage form, the concentration of reserpine, side effects, pharmaceutical elegance, taste, stability and the like. In general, the concentrations can vary within the following limits: between about ten and thirty percent for propylene glycol, between about one and forty percent for ethanol, and between about fifteen to 55 percent for sorbitol. About twelve percent ethanol, about ten percent propylene glycol, and about 28 percent sorbitol are preferred.

As used in the present specification the word "reserpine" is used in a generic sense to cover the therapeutically active derivatives of canescinic acid. These derivatives can be represented by the following structural formula:

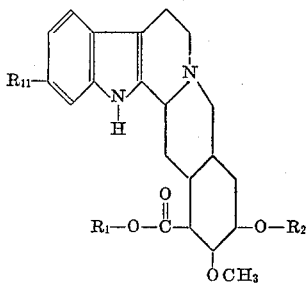

Broadly these derivatives can be separated into three categories: canescine

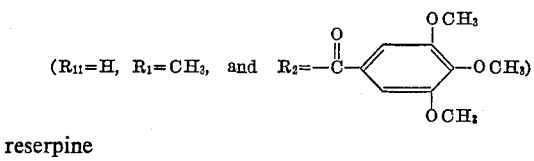

($R_{11}$=H, $R_1$=$CH_3$, and $R_2$=—C—$\langle\rangle$—O$CH_3$)

reserpine

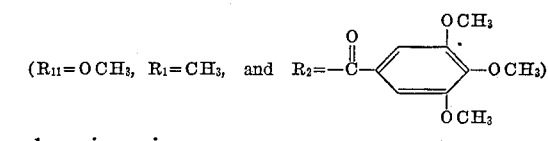

($R_{11}$=O$CH_3$, $R_1$=$CH_3$, and $R_2$=—C—$\langle\rangle$—O$CH_3$)

and rescinnamine

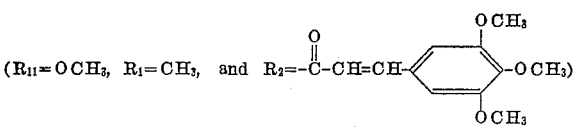

($R_{11}$=O$CH_3$, $R_1$=$CH_3$, and $R_2$=-C-CH=CH-$\langle\rangle$-O$CH_3$)

This would include the therapeutically active esters of canescinic acid, reserpic acid, methyl canescinate, and methyl reserpate.

In solution reserpine is unstable and deteriorates either (a) By hydrolysis of the two ester groups or (b) Upon exposure to light which is believed to cause changes in the indole ring system.

This latter type of deterioration is detectable by a green color formation.

In aqueous solutions of a pH lower than 9, the hydrolysis of reserpine is negligible. The pH of pharmaceutical preparations of reserpine is usually in the range of 3–7. Thus, the hydrolysis of reserpine in such products is insignificant. However, pharmaceutical products cannot constantly be protected from light. Therefore, the deterioration upon irradiation must be considered in connection with the stability of the preparation. The degree of irradiation-deterioration can be measured spectrophotometrically. When the absorption in the ultraviolet region of a freshly prepared solution of resperine in chloroform is compared with the absorption curve of the same solution after irradiation with ultraviolet light, it is apparent that changes have occurred in the reserpine molecule as evidenced by different absorption patterns. Undeteriorated reserpine has no absorption at 385 m$\mu$ whereas the irradiated (and deteriorated) material shows a significant absorption at this wave length. Thus, the absorption at 385 m$\mu$ can be used to determine the deterioration of reserpine. Absorption is measured in "optical density." Low optical density at 385 m$\mu$ indicates little deterioration and high optical density a high degree of deterioration.

It has been found that the addition of color which absorbs light over as wide a range of wave lengths as possible offers good protection for the reserpine against deterioration by irradiation. It is preferred to use a dark red (reddish-brown) color in the composition of the present invention. This has been found more stabilizing than other colors used by similar preparations now known to the art. Among the coloring materials which are useful in the composition of the present invention are caramel, F. D. and C. Red No. 1 (Ponceau 3R), F. D. and C. Red No. 2 (Amaranth), F. D. and C. Red No. 3 (Erythrosine), F. D and C. Red No. 4 (Ponceau S. X.) and combinations. The combination of caramel and F. D. and C. Red No. 2 is preferred.

In general the composition of the present invention is prepared by dissolving the reserpine in the indicated solvents and some water and bringing up to the desired volume with more water. Flavors and colors can be added as desired.

The following examples are illustrative of the composition and process of the present invention and are not to be construed as limiting.

EXAMPLE 1

4,000 millimeters of the composition of the present invention are prepared from the following types and amounts of ingredients:

Reserpine _____grams__ 0.2
Citric acid USP XIV_____do____ 5.47
Ethanol 95% USP XIV_____mls__ 600
Propylene glycol USP XIV_____mls__ 400
Sorbitol (as a 70% solution)_____mls__ 1600
Sodium citrate USP XIV_____grams__ 3
Flavors _____mls__ 12.6
Caramel N. F. IX_____grams__ 12
Amaranth USP XIV_____do____ 0.1
Purified water USP XIV, 4th supplement, sufficient to make up 4000 mls.

The reserpine and the citric acid are added to a mixture of 400 milliliters of water and 600 milliliters of alcohol. The mixture is stirred until reserpine and citric acid are in solution. The propylene glycol and sorbitol are stirred in, and water is added to make up approximately 3900 milliliters. The sodium citrate, and siutable flavors and colors to make up a dark reddish-brown color are added, and the mixture is made up to volume with water.

This composition comprises about 0.005 percent reserpine, about twelve percent ethanol, about ten percent propylene glycol, and about 28 percent sorbitol.

EXAMPLE 2

Following the procedure of Example 1, 4000 milliliters of the composition of the present invention are prepared from the following types and amounts of ingredients:

Reserpine _____grams__ 0.2
Ascorbic acid _____do____ 4.64
Ethanol 95% USP XIV _____mls__ 600
Propylene glycol USP XIV _____mls__ 400
Sorbitol (as a 70% solution) _____mls__ 1600
Sodium citrate USP XIV _____grams__ 3
Flavors _____mls__ 12.6
Caramel N. F. IX _____grams__ 12
Amaranth USP XIV _____do____ 0.1
Purified water USP XIV, 4th supplement, sufficient to make up 4000 mls.

This composition comprises about 0.005 percent reserpine, about twelve percent ethanol, about ten percent propylene glycol, and about 28 percent sorbitol.

EXAMPLE 3

Different solvents have a retarding or an enhancing effect on irradiation-deterioration of reserpine, e. g., chloroform solutions turn green much more rapidly than do alcohol solutions. In order to determine which pharmaceutically acceptable solvents have a stabilizing effect on reserpine, a series of different reserpine solutions were prepared in accordance with the procedure outlined in Example 1. The solutions were of the same concentrations with regard to reserpine. They were exposed to ultraviolet light for the same period of time. At the end of that period, the optical density at 385 m$\mu$ of the solutions was measured. Since the solutions were of the same concentration with regard to reserpine, the optical density indicated directly the deterioration of reserpine in each specific solvent system. Exactly fifty milliliters of each of solutions A, B, C, D, E, F, G, H, I and J were placed in clean flint bottles and irradiated for 24 hours with a G. E. ultraviolet sun lamp, 275W, 110–125 v., 60 cycles A. C. The distance from the lamp to the bottles was thirty inches. After 24 hours of irradiation the absorption of the solutions was measured in a Beckman DU Spectrophotometer at 385 m$\mu$ using blanks consisting of samples of the same solutions stored in darkness. Low optical density indicates less deterioration of reserpine.

*Table II*

| Dog No. | Mg./kg. Reserpine | Observations |
|---|---|---|
| 320 | .075/day-tablet | Less active and quiet in 7 hours; numerous bowel evacuations in 24 hours; depressed with muscular tremors and nictitating membrane relaxed slightly at 72 hours. |
| 198 | do | Less active and quiet with numerous bowel evacuations in 24 hours; nictitating membrane relaxed slightly at 72 hours. |
| 260 | .050 Elixir one dose | Tranquilized; numerous bowel evacuations, and nictitating membrane relaxed 24 hours. |
| 293 | do | Slight hypnosis at 1 hour and definite at 2½ hours; nauseated at 2½ hours; soft numerous stools, sleepy and nauseated at 4½ hours; nictitating membrane protrudes slightly at 7 hours. |
| 337 | do | Very slightly tranquilized at 6 hours; tranquilized with nictitating membrane protruding to cornea in 24 hours. |

It is plain from the results that the composition of the present invention has a more rapid relaxing effect on the nictitating membrane than the reserpine tablets. Relaxation of the nictitating membrane is a recognized measure of tranquilization.

It is to be understood that the invention is not to be

*Table I*

| | A | B | C | D | E | F | G | H | I | J |
|---|---|---|---|---|---|---|---|---|---|---|
| Reserpine | 0.05 gm. (0.05%). | 0.05 gm. (.005%). | 0.05 gm. (.005%). | 0.05 gm. (.005%). | 0.05 gm. (.005%). | 0.05 gm. (.005%). | 0.05 gm. (.005%). | 0.05 gm. (.005%). | 0.05 gm. (.005%). | 0.05 gm. (.005%). |
| Ethanol (95%) | 150 mls. (12%). | 150 mls. (12%). | 150 mls. (12%). | 150 mls. (12%). | | | 150 mls. (12%). | 150 mls. (12%). | 150 mls. (12%). | 150 mls. (12%). |
| Propylene glycol | 100 mls. (10%). | | | | 100 mls. (10%). | 100 mls. (10%). | 100 mls. (10%). | 100 mls. (10%). | 4 (10%). | 100 mls. (10%). |
| Sorbitol (70%) | 400 mls. (28%). | 400 mls. (28%). | 400 mls. (28%). | 400 mls. (28%). | 400 mls. (28%). | | 400 mls. (28%). | 400 mls. (28%). | 400 mls. (28%). | 400 mls. (28%). |
| Acid: Citrate buffer [1] | 2.12 gms | 2.12 gms | 2.12 gms | 2.12 gms | 2.12 gms | 2.12 gms | | | | |
| Acid: Benzoic | | | | | | | 0.80 gm | | | |
| Acid: Ascorbic | | | | | | | | | 1.16 gm | |
| Acid: Acetyl salicylic | | | | | | | | 1.20 gm | | |
| Polyethylene glycol "300" | | | 100 mls | | | | | | | |
| N,N-dimethylacetamide | | | | 50 mls | | | | | | |
| Optical Density × 100 | 0.170 | 0.238 | 0.388 | 0.291 | 0.184 | 0.320 | 0.079 | 0.267 | 0.006 | 0.004 |

[1] 5.5 parts citric acid and 3 parts sodium citrate by weight.
In all solutions sufficient water was added to make up 1000 milliliters.

It is apparent from these data that solutions I and J are the most resistant to deterioration from irradiation. Both contain ethanol, propylene glycol and sorbitol and differ from each other by the addition of asorbic acid in solution I. The superiority of and special preference for ascorbic acid over the other acids from the standpoint of stability is thus also readily apparent. Although benzoic acid appears to be superior to citric acid from the standpoint of stability, it is not preferred over citric acid because the former is not sufficiently soluble in water. The data also show that the vehicle containing sorbitol is superior to the comparable vehicle in which sorbitol is excluded (e. g., compare solution E with solution F), and that the vehicles containing the combination of sorbitol, propylene glycol and ethanol are all superior to comparable solutions with any one member excluded (e. g. solution A is superior to any one of solutions B, C, D, E and F). Finally, the replacement of propylene glycol by polyethylene glycol "300" and N,N-dimethylacetamide (e. g., compare solution A with solutions C and D), markedly increased the deterioration of reserpine.

In order to compare the effect of reserpine in tablet form with reserpine in the elixir form of the novel composition of the present invention, the dosage forms were compared by administration to dogs and observation of the effects. The elixir had the same composition as that described in Example 1. The results are tabulated in Table II.

limited to the exact details of operation or compositions shown and described, as obvious modifications and equivalents will be apparent to one skilled in the art, and the invention is therefore to be limited only by the scope of the appended claims.

We claim:

1. A therapeutic composition comprising from about 0.001 to 0.5 percent reserpine as the essential active ingredient in solution and an aqueous solvent system containing from about ten to thirty percent propylene glycol and from about twenty to eighty percent sorbitol.

2. A therapeutic composition comprising from about 0.001 to 0.5 percent reserpine as the essential active ingredient in solution and an aqueous solvent system containing from about one to forty percent ethanol, from about ten to thirty percent propylene glycol, and from about twenty to eighty percent sorbitol.

3. The composition of claim 2 having a pH less than about 9.

4. The composition of claim 2 containing citric acid as a part of the solvent system.

5. The composition of claim 2 containing ascorbic acid as a part of the solvent system.

6. A therapeutic composition comprising about 0.005 percent reserpine as the essential active ingredient in solution and an aqueous solvent system containing about twelve percent ethanol, about ten percent propylene glycol, and about 28 percent sorbitol.

7. The composition of claim 6 with the pH adjusted to about 4 by the addition of a member of the group consisting of citric acid and ascorbic acid and adjusted to a reddish-brown color with carmel and amaranth.

References Cited in the file of this patent

UNITED STATES PATENTS

| | | |
|---|---|---|
| 2,623,839 | Taub | Dec. 30, 1952 |
| 2,788,309 | Cooper | Apr. 9, 1957 |

FOREIGN PATENTS

| | | |
|---|---|---|
| 739,800 | Great Britain | Oct. 19, 1954 |

OTHER REFERENCES

Pletscher et al.: J. of Pharm. and Exp. Therap., pp. 84–89 (pert.) pp. 85–86, January 1956.

Banes: J. of Am. Pharm. Assn., Sci. Ed., vol. 44, No. 7, pp. 408–411, p. 410 pert.

Brown: Quarterly J. of Pharm. and Pharmacol. 1935, vol. 8, pp. 390–397.

Speel: Am. J. of Pharmacy, April 1941, pp. 134-141.

Merck Report, Merck and Co., April 1945, pp. 17–18.